Patented Apr. 1, 1924.

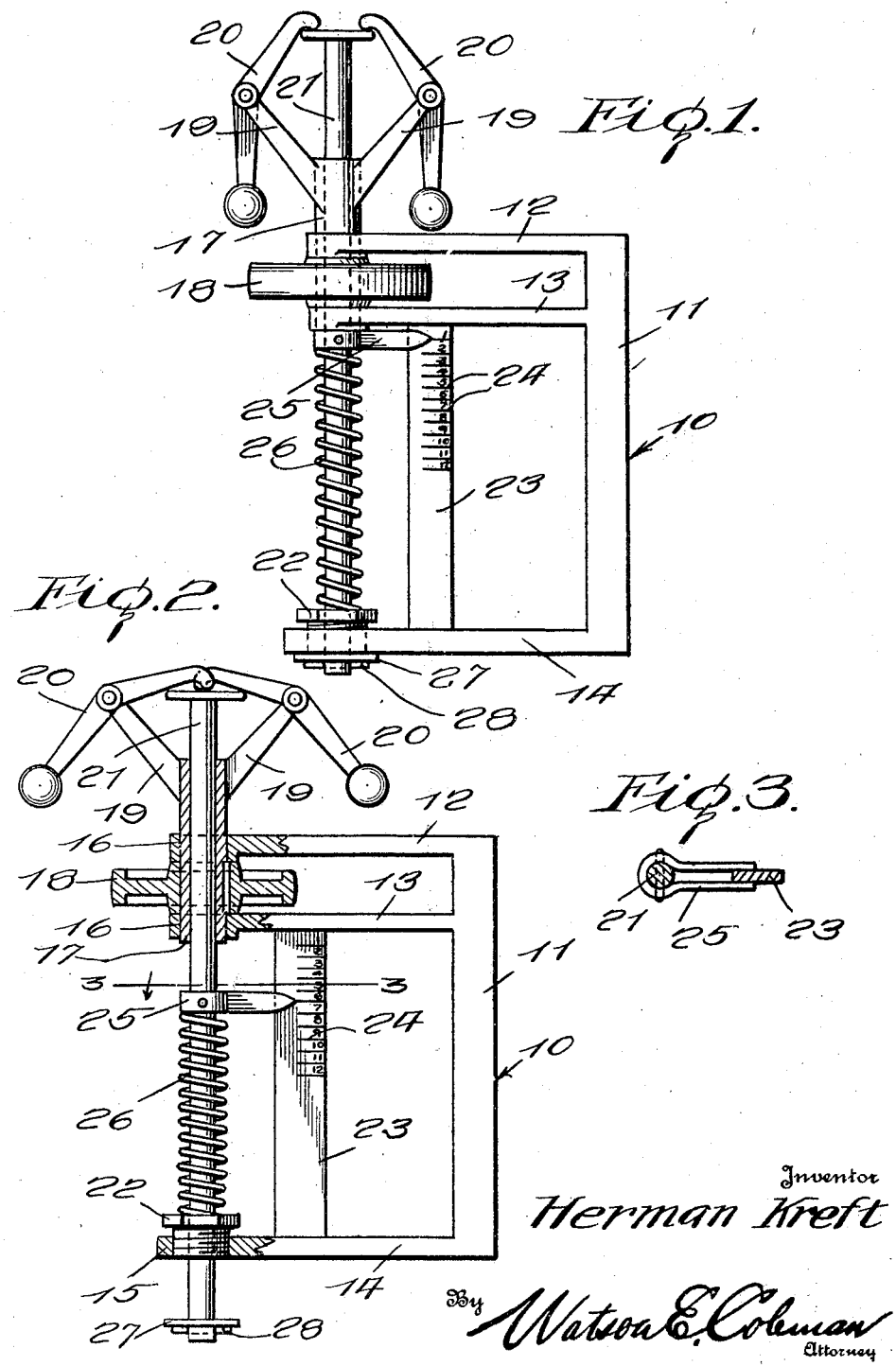

1,489,132

UNITED STATES PATENT OFFICE.

HERMAN KREFT, OF AMBERG, WISCONSIN.

SPEED INDICATOR.

Application filed June 2, 1923. Serial No. 643,130.

*To all whom it may concern:*

Be it known that I, HERMAN KREFT, a citizen of the United States, residing at Amberg, in the county of Marinette and State of Wisconsin, have invented certain new and useful Improvements in Speed Indicators, of which the following is a specification, reference being had to the accompanying drawings.

This invention relates to speed indicators and more particularly to a device of this character especialy adapted for use in setting the valves of a steam engine.

An important object of the invention is to provide a simply constructed, readily adjustable device of this character which is capable of indicating variations of speed and which may be operated by engagement of a friction wheel forming a part thereof with the periphery of the fly wheel of the engine during operation thereof.

An important object of the invention is to provide a device of this character which may be adjusted to provide an accurate reading at different speeds. As is well known to those familiar with the art, uneven setting of the valves of a steam engine results in an uneven operation thereof, in other words, more steam is admitted at one end of the cylinder than at the opposite end, with the result that the piston will travel with greater speed when leaving the first named end of the cylinder than when leaving the second and this different speed results in a jerky operation of the engine causing the loss of efficiency during such operation and increased wear upon the bearings and connections of the various parts thereof. Those speed indicators with which I am familiar are incapable of use for determining whether or no there is a difference in speed of operation of the piston between the various ends of the strokes since they are not so constructed that they can be employed upon the periphery of the fly wheel of the engine. Such unevenness of operation is in greatest evidence when the engine is operated at its lowest speed and accordingly the ordinary speed indicators will provide no indication which would be readable.

An important object of this invention is to provide a device which may be engaged against the periphery of the wheel of the engine and which is sufficiently delicate to provide a difference of reading, indicating a difference in speed of operation of the pistons at low speeds of the engine.

These and other objects I attain by the construction shown in the accompanying drawings, wherein for the purpose of illustration is shown a preferred embodiment of my invention and wherein:—

Figure 1 is a side elevation of a speed indicator constructed in accordance with my invention;

Figure 2 is a sectional view therethrough; and

Figure 3 is a section on the line 3—3 of Figure 2.

Referring now more particularly to the drawings, the numeral 10 indicates the main frame comprising a base bar 11 from one end of which project outwardly a pair of spaced arms 12 and 13 and at the opposite end a single arm 14 is provided. The arm 14 has formed therein a screw-threaded aperture 15 aligning with openings 16 formed in the arms 12 and 13.

The openings 16 of the arms 12 and 13 form a bearing for a sleeve 17 upon which intermediate the arms is mounted a friction wheel, the periphery of which extends beyond the free ends of the arms 12 and 13. The friction wheel 18 has such engagement with the arms 12 and 13 that longitudinal movement of the sleeve 17 is prevented. The outer end of the sleeve has mounted thereon supports 19 to which are pivoted intermediate their ends fly ball levers 20, the ends of which overhang the end of a rod 21 slidably directed through the bore of the sleeve. The opposite end of the rod 21 is slidably engaged in the bore of an adjusting nut 22 engaged in the threaded opening 15 of the arm 14.

Paralleling the rod 21 and secured at its ends to the arms 13 and 14 is a gauge bar 23 provided with consecutive indicia 24 secured to the rod 21 and a pointer member 25 which coacts with the indicia of the gauge bar 23. Between the adjusting nut 22 and the pointer 25, a spring 26 surrounds the rod 21 and serves to urge the rod through the sleeve 17, movement of the rod in this direction being limited by a stop member 27, in the present instance illustrated as a washer mounted upon the rod 21 and held against movement thereon by means of a cotter pin 28.

In the use of the device the periphery of the disk 18 is forced into engagement with the periphery of the fly wheel, the engine having first been throttled so that it runs at its lowest possible speed. The rotation thus imparted to the sleeve 17 is transmitted to the fly ball arms 20 with the result that these arms are actuated and the rod 21 is forced longitudinally against the action of the spring 26 by the operation thereof. As is well known to those familiar with the art, an engine when throttled to the lowest possible point at which it will operate operates with a rather jerky motion, the fly wheel thereof nearly stopping upon the dead centers, then picking up speed as steam is admitted to the cylinders. Accordingly, the rod 21 will be intermittently actuated, shifting upon the scale or gauge bar 23 by the dead centers to various points on the scale. If the operation of the engine actuated by the admission of steam at opposite ends of the cylinder is uneven, this will be indicated by the coaction of the pointer with the indicia. For example, during one cycle of the operation the scale will possibly read 8 while during a second cycle the scale would read 10, such operation indicates that the valves are unevenly set and the direction of setting the valve can be readily determined by noting at which end of the stroke the high or low speed occurs. When the cycles are balanced proper setting of the valves is of course indicated.

From the foregoing it is believed to be obvious that a device of this character, while very simple in its construction and operation, is admirably suited for use for the purpose for which it is intended. It is pointed out that by adjusting the nut 22 to increase or decrease the tension of the spring, accurate alignment of the pointer 25 with the indicia of the scale may be had regardless of the speed of operation of the engine. It will furthermore be obvious that the construction of the device as hereinbefore set forth is capable of some change and modification without materially departing from the spirit of my invention and I accordingly do not limit myself to such specific structure except as hereinafter claimed.

I claim:—

1. In a device of the type described, a frame provided adjacent one end with a pair of spaced arms and at the opposite end with a third arm, a sleeve rotatably mounted in said pair of arms, a friction disk secured to the sleeve intermediate the arms and by its engagement with the arms preventing longitudinal movement of the sleeve, fly ball arms pivoted to one end of the sleeve, a rod directed through the sleeve and against which the inner ends of the fly ball arms engage, a bearing for said rod carried by the last named arm of the frame, a pointer carried by the rod, a spring surrounding the rod intermediate the last named arm and the pointer, and a scale extending intermediate the last named arm and the adjacent arm of the pair and with which the pointer coacts.

2. In a device of the type described, a frame provided adjacent one end with a pair of spaced arms and at the opposite end with a third arm, a sleeve rotatably mounted in said pair of arms, a friction disk secured to the sleeve intermediate the arms and by its engagement with the arms preventing longitudinal movement of the sleeve, fly ball arms pivoted to one end of the sleeve, a rod directed through the sleeve and against which the inner ends of the fly ball arms engage, a bearing for said rod carried by the last named arm of the frame, a pointer carried by the rod, a spring surrounding the rod intermediate the last named arm and the pointer, a scale extending intermediate the last named arm and the adjacent arm of the pair and with which the pointer coacts, said bearing being adjustable in said arm to thereby control the compression of the spring and means for limiting the movement of the rod under influence of the spring.

In testimony whereof I hereunto affix my signature.

HERMAN KREFT.